3,578,696
METHOD FOR PRODUCING MALONONITRILE
Joachim Hillard Blanck, 260—16 69th Ave., Glen Oaks, N.Y. 11004, and Martin Prince, 58 Darlington Drive, Wayne, N.J. 07470
No Drawing. Filed Aug. 5, 1968, Ser. No. 749,936
Int. Cl. C07c 121/22, 121/02
U.S. Cl. 260—465.3       11 Claims

ABSTRACT OF THE DISCLOSURE

Malononitrile is produced by direct vapor phase reaction of allene and ammonia in the presence of oxygen at a temperature in the range of 650° F. to 1000° F. and preferably in the presence of a catalyst such as bismuth phosphomolybdate or bismuth phosphotungstate on a catalytic support. Water may be advantageously used to be premixed with the reactants before passing over the catalyst to effect the vapor phase reaction.

BACKGROUND OF THE INVENTION

(1) Field of the invention

This invention relates to the production of malononitrile by oxidative ammonolysis of allene in a direct vapor phase reaction.

(2) Description of the prior art

The general method for preparing malononitrile commercially involves the acid induced elimination of water from cyanoacetamide in accordance with the following reaction:

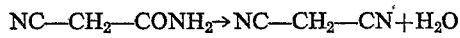

$$NC-CH_2-CONH_2 \rightarrow NC-CH_2-CN + H_2O$$

The dehydration reaction is carried out by reacting cyanoacetamide with at least a stoichiometric amount of a chemical dehydrating agent of which the most commonly used is phosphorus trioxychloride. The reaction is normally conducted in the liquid phase using a solvent such as ethylene dichloride and at a relatively low temperature range between 140° F. to 212° F. The use of a low temperature liquid phase process is precautionary for preventing the decomposition of cyanoacetamide to form polymeric substances with simultaneous releasing of ammonia. The ammonia from the decomposition combines with the malononitrile in the reaction mixture to form an unstable mixture capable of explosion.

In the reaction of cyanoacetamide and phosphorus trioxychloride, the water of dehydration abstracted from the amide further reacts with phosphorus trichloride to liberate hydrogen chloride and to form a precipitate of the hydrolyzates of $POCl_3$. The precipitate is viscous and sticky, large amount of absorbents such as sodium chloride and solvents are normally required to prevent its deposition onto the reaction vessel. The use of absorbents and large amounts of solvent requires additional unit operations such as filtration and solvent recovery by distillation, and the capacities of the equipment for the production of malononitrile are drastically reduced.

The use of a phosphorus dehydrating agent in these commercial processes has further disadvantages. The presence of phosphorous impurities in the malononitrile, even in a minute amount, made it undesirable as a starting material for the synthesis of a number of organic compounds such as tear gas and vitamin.

SUMMARY OF THE INVENTION

We have discovered that malononitrile can be prepared economically and continuously by oxidative ammonolysis of allene in preferably a direct vapor phase reaction. Broadly stated, the method of this invention comprises reacting allene with ammonia in the presence of oxygen and at a temperature above about 650° F. but below about 1000° F. The malononitrile thus produced may be recovered from the resultant reaction mixture by the conventional method.

Advantageously, the reaction is carried out by initially mixing the reactants and preheating the reaction mixture to about the reaction temperature. Thereafter, the preheated mixture is fed through a catalytic bed to effect a direct vapor phase oxidative ammonolysis. The catalysts suitable for this reaction include bismuth, tin, and antimony salts of molybdic and phosphomolybdic acids, bismuth phosphotungstate, molybdenum oxides treated with phosphoric acid or sodium hydroxide, antimony and tin oxides, cobalt molybdate, tellurium oxide, vanadium pentoxide, nickel oxide, iron phosphate, and their mixtures on a proper catalytic support such as alumina and silica. We found bismuth phosphomolybdate and bismuth phosphotungstate support on silica or other inert catalytic carrier to be particularly suitable.

In carrying out the reaction in the vapor phase, the presence of water vapor tends to promote the reaction. The $H_2O$ may be premixed with the reactants before preheating to the reaction temperature.

DESCRIPTION OF THE PREFERRED EMBODIMENTS

The exact reaction mechanism for the oxidative ammonolysis of allene is not completely understood. In theory, the reaction between allene, ammonia, and oxygen may proceed according to the following equation:

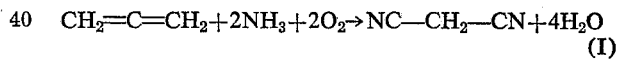

$$CH_2=C=CH_2 + 2NH_3 + 2O_2 \rightarrow NC-CH_2-CN + 4H_2O \quad (I)$$

However, it is possible that reaction (I) produces acrylonitrile as a by-product which, in turn, is ammonoxidated to malononitrile in accordance with the following equation:

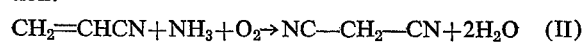

$$CH_2=CHCN + NH_3 + O_2 \rightarrow NC-CH_2-CN + 2H_2O \quad (II)$$

In actual practice, oxidative ammonolysis of allene may be carried out under a wide range of reaction conditions. The reaction will proceed at a temperature as low as 650° F. although the yield at the low temperature range is generally poor. At a higher temperature, both the reaction rate and the yield are improved. We found, at a temperature above about 800° F., malononitrile is produced without a catalyst. At the reaction temperature, the ammonoxidation may be carried out under a wide range of pressure roughly from subatmospheric to superatmospheric pressure. We found the reaction carried out at an atmospheric condition to be entirely satisfactory.

The upper limit for the reaction temperature is controlled, to a certain extent, by the reaction pressure. In the atmospheric condition, the reaction does not appear to be benefited when the temperature is above about 1000° F. At this high temperature, excess side reactions substantially lower the yield of malononitrile.

The yield of malononitrile generally improves when a catalyst, such as those set forth above, is used to promote the reaction. When a catalyst is used, the vapor phase reaction may be advantageously carried out in a fluidized bed of catalyst or in a fixed bed of catalyst in which the reaction time may be regulated by the residence time of the reactants in the fluid bed or by the throughput of the reaction mixture in the fixed bed. A reaction time in the range of 1 second to 50 seconds generally is adequate.

The amount of ammonia and oxygen required for the reaction may be varied within a wide range. There does not appear to be any critical limitation. However, the yield is generally poor when the amounts of reactants used deviate substantially from the stoichiometric requirement and the recycling of one or more of the reactants is not used. In a continuous process without recycling, the molar ratios of allene to ammonia and oxygen to allene should be at least about 1.

For optimum results, the reaction should be carried out at a temperature above about 900° F. and preferably at about 950° F. The reaction mixture should contain about a stoichiometric amount of reactants which preferably are premixed and preheated to about the reaction temperature prior to the oxidative ammonolysis reaction. Excess amounts of oxygen and ammonia above the stoichiometric requirement may be used which, in certain instances, improve the yield of malononitrile based on the allene consumption.

The product yield is also increased when a certain amount of $H_2O$ is premixed with the reaction mixture prior to the reaction. The optimum amount of $H_2O$ for the reaction is about 1 to 2 moles for each mole of allene, although an amount up to about 3 moles of $H_2O$ per mole allene can be used.

For a fixed bed reaction, the reaction time (the duration the reaction mixture is in contact with the catalyst) should be above about 1 second. A range of 1 to 15 seconds is found to be optimal using a fixed bed of bismuth phophomolybdate or bismuth phosphotungstate supported on silica.

The allene used does not have to be pure. Technical grade allene containing as low as 40% by weight of allene may be used economically provided it does not contain impurities which react with one or more of the other reactants to form products which may be difficult to separate from malononitrile. $NH_3$ used preferably is anhydrous ammonia, and the oxygen required may be conveniently supplied by air.

Further to illustrate this invention, specific examples are described hereinbelow. In each of these examples, the reaction is carried out in a vertical stainless steel cylindrical reactor having about 1.25 inch outside diameter with a wall thickness of about 0.025 inch. The reactor is about 24 inches long and is placed inside an oven. A stainless steel wool plug is placed at about the lower end of the reactor and the tube is loaded with bismuth phosphomolybdate or bismuth phosphotungstate supported by silica to a height of about 12 inches. The catalysts are granular having particle size of about 40 to 100 mesh. Sources of air, allene, and ammonia as well as $H_2O$ are connected to the top of the reactor. The amounts of air, allene, and ammonia are controlled by valves and are monitored by rotometers and the amount of $H_2O$ injected into the reaction is controlled by a syringe pump. The reaction mixture which enters the reactor will be preheated in the space above the fixed bed of catalyst. The reaction product is collected in a vessel, cooled to about −10° C. to −20° C. by a mixture of Dry Ice and trichloroethylene.

EXAMPLES 1-10

In these examples, the molar ratios of the components in the reaction mixture as well as the reaction temperatures and the total time for the run are tabulated in Table I.

Examples 1, 3 to 8 used bismuth phosphomolybdate, Examples 9 and 10 used bismuth phosphotungstate, and Example 2 used no catalyst.

TABLE I

| Example | Mole ratio of components | | | | Temp., °F. | Time for the run (min.) |
|---|---|---|---|---|---|---|
| | $C_3H_4$ | Air | $H_2O$ | $NH_3$ | | |
| 1 | 1.0 | 7.5 | 1.0 | 1.5 | 950 | 35 |
| 2 | 1.0 | 7.5 | 2.0 | 1.5 | 950 | 60 |
| 3 | 1.0 | 7.5 | 2.0 | 1.5 | 950 | 90 |
| 4 | 1.0 | 7.5 | 1.0 | 1.5 | 950 | 300 |
| 5 | 1.0 | 15.0 | 1.0 | 1.5 | 950 | 390 |
| 6 | 1.0 | 15.0 | 1.0 | 2.0 | 950 | 60 |
| 7 | 1.0 | 15.0 | 1.5 | 2.0 | 950 | 60 |
| 8 | 1.0 | 15.0 | 1.5 | 2.0 | 850 | 60 |
| 9 | 1.0 | 15.0 | 1.5 | 2.0 | 950 | 60 |
| 10 | 1.0 | 15.0 | 1.5 | 1.0 | 950 | 60 |

The products collected were analyzed. The analytical methods were based upon examination of the organic and aqueous phases resulting from the reaction by infrared techniques. The aqueous phases were examined by extracting with various organic solvents such as benzene, chloroform, and methyl isobutyl ketone. Standard solutions of each solvent with known malononitrile contents were prepared and plots of nitrile absorption versus concentration were made. These all resulted in a straight-line relationship as expected from the Beer-Lambert Law. The analytical results are summarized in Table II.

TABLE II

| Example: | Yield, percent [1] |
|---|---|
| 1 | 5 |
| 2 (no catalyst used) | 1.5 |
| 3 | 8 |
| 4 | 10 |
| 5 | 18 |
| 6 | 28 |
| 7 | 36 |
| 8 | 21 |
| 9 | 13.5 |
| 10 | 2 |

[1] Of malononitrile (based on $C_3H_4$).

We claim:

1. A method for the production of malononitrile which comprises reacting allene with ammonia in the presence of oxygen and a catalyst wherein the catalyst is a material selected from the group consisting essentially of bismuth, tin and antimony salts of molybdic acid, bismuth, tin and antimony salts of phosphomolybdic acid, bismuth phosphotungstate, molybdenum oxides treated with phosphoric acid or sodium hydroxide, antimony oxides, tin oxides, cobalt molybdate, tellurium oxide, vanadium pentoxide, nickel oxide and iron phosphate, at a temperature above about 650° F. but below about 1000° F., the oxygen and ammonia being present in molar amounts at least equal to the molar amount of allene, and recovering the malononitrile from the reaction mixture.

2. A method according to claim 1 wherein the catalyst is supported on an inert catalytic carrier.

3. A method according to claim 2 wherein the catalytic carrier is silica.

4. A method according to claim 1 wherein the reaction is carried out in the presence of $H_2O$.

5. A method according to claim 4 wherein allene, ammonia, and oxygen in the form of a reaction mixture are preheated substantially to the reaction temperature before passing through the catalyst to effect the production of malononitrile.

6. A method according to claim 5 wherein the molar ratio of allene to ammonia is at least about 1 and the molar ratio of oxygen to allene is at least about 1.

7. A method according to claim 6 wherein the amount of allene to $H_2O$ is at least about 1.

8. A method according to claim 1 wherein the catalyst is bismuth phosphomolybdate.

9. A method according to claim 1 wherein the catalyst is bismuth phosphotungstate.

10. A method for the production of malononitrile which comprises reacting allene with ammonia in the presence of oxygen at a temperature above about 800° F. but below about 1000° F. in the absence of a catalyst, the oxygen and ammonia being present in molar amounts at least equal to the molar amount of allene, and recovering the malononitrile from the reaction mixture.

11. A method according to claim 10 wherein the reaction is carried out in the presence of $H_2O$.

References Cited

UNITED STATES PATENTS

| | | | |
|---|---|---|---|
| 3,308,151 | 3/1967 | Callahan et al. | 260—465.3 |
| 3,338,952 | 8/1967 | Callahan et al. | 260—465.3 |
| 3,342,849 | 9/1967 | Brill et al. | 260—465.3 |
| 3,345,397 | 10/1967 | Finley | 260—465.3 |

JOSEPH P. BRUST, Primary Examiner

U.S. Cl. X.R.

260—465.2, 465.8